United States Patent
Tsai et al.

(10) Patent No.: US 10,057,120 B2
(45) Date of Patent: *Aug. 21, 2018

(54) TRANSIENT UNPRUNING FOR FASTER LAYER-TWO CONVERGENCE

(71) Applicant: Cisco Technology, Inc., San Jose, CA (US)

(72) Inventors: Chiajen Tsai, Cupertino, CA (US); Norman Finn, Livermore, CA (US); Yibin Yang, San Jose, CA (US); Nagabhushan K. Channabasappa, Santa Clara, CA (US); Debashis Patnala Rao, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 525 days.

This patent is subject to a terminal disclaimer.

(21) Appl. No.: 14/449,923

(22) Filed: Aug. 1, 2014

(65) Prior Publication Data

US 2014/0344426 A1 Nov. 20, 2014

Related U.S. Application Data

(63) Continuation of application No. 13/189,334, filed on Jul. 22, 2011, now Pat. No. 8,812,708.

(51) Int. Cl.
| | | |
|---|---|---|
| *G06F 15/16* | (2006.01) |
| *H04L 12/24* | (2006.01) |
| *H04L 12/721* | (2013.01) |
| *H04L 12/46* | (2006.01) |

(52) U.S. Cl.
CPC .......... *H04L 41/0816* (2013.01); *H04L 41/12* (2013.01); *H04L 45/66* (2013.01); *H04L 12/4687* (2013.01); *H04L 12/4695* (2013.01)

(58) Field of Classification Search
CPC . H04L 12/462; H04L 12/185; H04L 12/1868; H04L 41/12; H04L 41/0816
USPC ........................................ 370/256, 312, 390
See application file for complete search history.

(56) References Cited

U.S. PATENT DOCUMENTS

| | | | |
|---|---|---|---|
| 6,473,403 B1 | 10/2002 | Bare | |
| 6,526,054 B1* | 2/2003 | Li | H04L 12/185 370/390 |
| 6,728,777 B1 | 4/2004 | Lee | |
| 6,937,576 B1* | 8/2005 | Di Benedetto | H04L 12/462 370/256 |
| 7,286,491 B1 | 10/2007 | Smith | |
| 7,525,974 B2 | 4/2009 | Mancour | |
| 7,551,571 B2 | 6/2009 | Goldberg | |
| 2002/0101875 A1 | 8/2002 | Lui | |
| 2004/0218551 A1* | 11/2004 | Goldberg | H04L 12/462 370/256 |
| 2010/0165907 A1* | 7/2010 | Chu | H04L 12/1868 370/312 |

* cited by examiner

*Primary Examiner* — Dustin Nguyen
(74) *Attorney, Agent, or Firm* — Baker Botts L.L.P.

(57) ABSTRACT

In one embodiment, a method includes detecting a change in network topology and broadcasting a transient unconditional unpruning message to multiple nodes in the network. The message is configured to instruct each of the nodes receiving the message to start a phase timer in response to the broadcast message; unprune its operational ports; and, upon expiration of the phase timer, prune its ports in accordance with the results of a pruning protocol.

18 Claims, 6 Drawing Sheets

TRANSIENT UNPRUNING FOR FASTER LAYER-TWO CONVERGENCE

PRIORITY

This application is a continuation under 35 U.S.C. § 120 of U.S. patent application Ser. No. 13/189,334 filed 22 Jul. 2011 and entitled "Transient Unpruning for Faster Layer-Two Convergence," which is incorporated herein by reference.

TECHNICAL FIELD

This disclosure generally relates to virtual local area networks (VLANs).

BACKGROUND

Multiple VLAN registration protocol (MVRP) is used in layer-two networks to conserve bandwidth by preventing unnecessary flooding. MVRP prunes ports in the active network topology so that traffic will be flooded over only necessary links. The underlying active topology can be generated by different loop prevention protocols such as spanning tree protocol (STP), multiple spanning tree (MST), and resilient Ethernet protocol (REP). During network topology changes, such as interfaces going down, pruning states of ports in a network may need to be reprogrammed. How fast the pruning states can be updated will affect the speed of layer two network convergence.

DESCRIPTION OF EXAMPLE EMBODIMENTS

Overview

In one embodiment, a mechanism called transient unpruning (TUP) enhances layer two convergence after a topology change. During the initial phase of a topology change, switches in the layer-two network are notified to unprune either all ports indiscriminately or a subset based on user configuration. Once settled, the pruning states are synchronized with multiple VLAN registration protocol (MVRP) and then continue to be controlled by MVRP. In particular embodiments, this mechanism achieves faster convergence at the cost of potential initial excessive flooding.

Description

Figure 1:
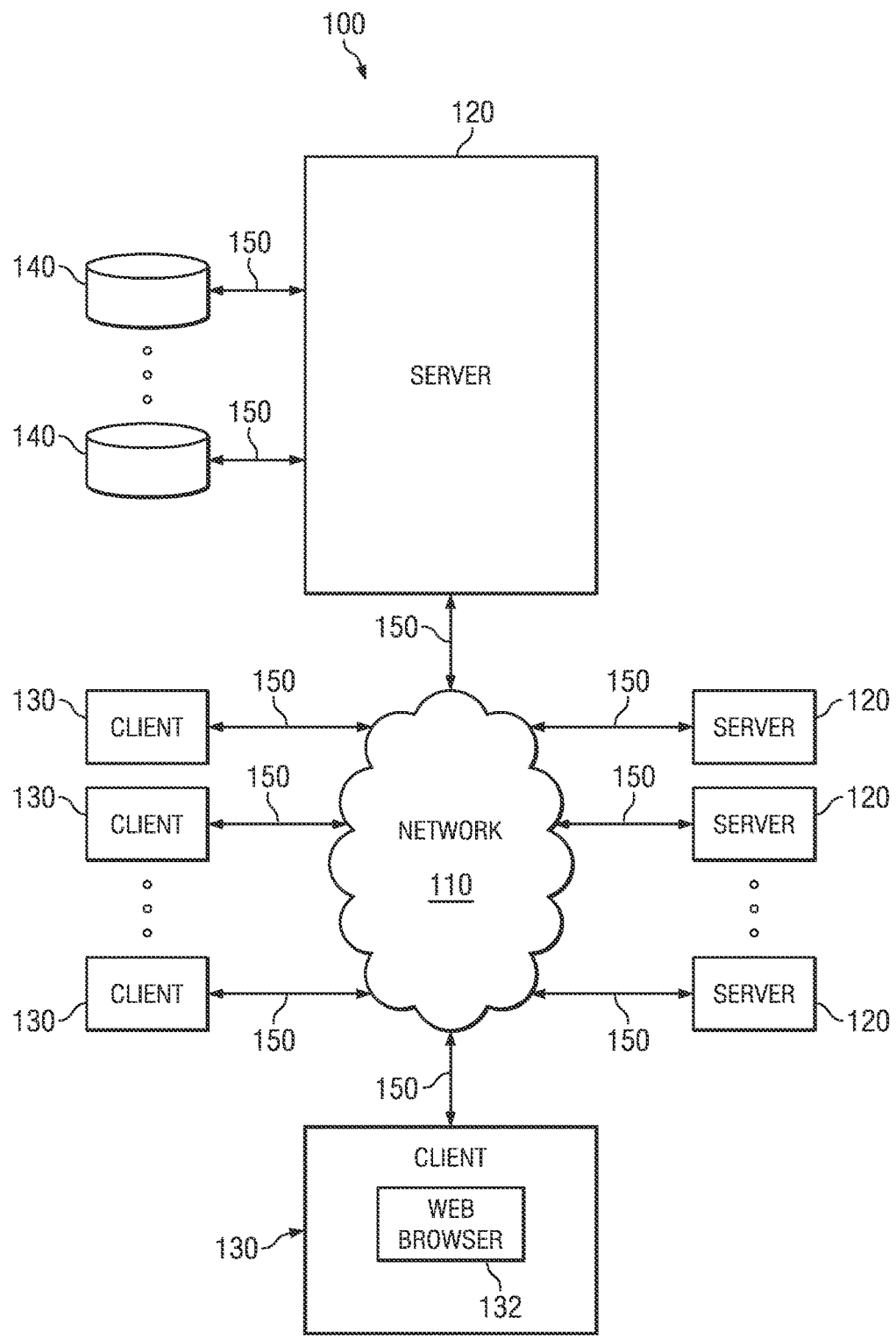
FIG. 1 illustrates an example network environment.

FIG. 1 illustrates an example network environment 100. This disclosure contemplates any suitable network environment 100. As an example and not by way of limitation, although this disclosure describes and illustrates a network environment 100 that implements a client-server model, this disclosure contemplates one or more portions of a network environment 100 being peer-to-peer, where appropriate. Particular embodiments may operate in whole or in part in one or more network environments 100. In particular embodiments, one or more elements of network environment 100 provide functionality described or illustrated herein. Particular embodiments include one or more portions of network environment 100. Network environment 100 includes a network 110 coupling one or more servers 120 and one or more clients 130 to each other. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 couple servers 120 and clients 130 to network 110 or to each other. This disclosure contemplates any suitable links 150. As an example and not by way of limitation, one or more links 150 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 150. In particular embodiments, one or more links 150 each includes an intranet, an extranet, a VPN, a LAN, a WLAN, a WAN, a MAN, a communications network, a satellite network, a portion of the Internet, or another link 150 or a combination of two or more such links 150. Links 150 need not necessarily be the same throughout network environment 100. One or more first links 150 may differ in one or more respects from one or more second links 150.

This disclosure contemplates any suitable servers 120. As an example and not by way of limitation, one or more servers 120 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 120 includes hardware, software, or both for providing the functionality of server 120. As an example and not by way of limitation, a server 120 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 130, the web server may communicate one or more such files to client 130. As another example, a server 120 that operates as a mail server may be capable of providing e-mail services to one or more clients 130. As another example, a server 120 that operates as a database server may be capable of providing an interface for interacting with one or more data stores (such as, for example, data stores 110 described below). Where appropriate, a server 120 may include one or more servers 120; be unitary or distributed; span multiple locations; span multiple machines; span multiple datacenters; or reside in a cloud, which may include one or more cloud components in one or more networks.

In particular embodiments, one or more links 150 may couple a server 120 to one or more data stores 140. A data store 140 may store any suitable information, and the contents of a data store 140 may be organized in any suitable manner. As an example and not by way or limitation, the contents of a data store 140 may be stored as a dimensional, flat, hierarchical, network, object-oriented, relational, XML, or other suitable database or a combination or two or more of these. A data store 140 (or a server 120 coupled to it) may include a database-management system or other hardware or software for managing the contents of data store 140. The database-management system may perform read and write operations, delete or erase data, perform data de-duplication, query or search the contents of data store 140, or provide other access to data store 140.

In particular embodiments, one or more servers 120 may each include one or more search engines. A search engine may include hardware, software, or both for providing the functionality of search engine. As an example and not by way of limitation, a search engine may implement one or more search algorithms to identify network resources in response to search queries received at search engine, one or more ranking algorithms to rank identified network resources, or one or more summarization algorithms to summarize identified network resources. In particular embodiments, a ranking algorithm implemented by a search engine may use a machine-learned ranking formula, which the ranking algorithm may obtain automatically from a set of training data constructed from pairs of search queries and selected Uniform Resource Locators (URLs), where appropriate.

In particular embodiments, one or more servers 120 may each include one or more data monitors/collectors. A data monitor/collection may include hardware, software, or both for providing the functionality of data collector/collector. As an example and not by way of limitation, a data monitor/collector at a server 120 may monitor and collect network-traffic data at server 120 and store the network-traffic data in one or more data stores 140. In particular embodiments, server 120 or another device may extract pairs of search queries and selected URLs from the network-traffic data, where appropriate.

This disclosure contemplates any suitable clients 130. A client 130 may enable a user at client 130 to access or otherwise communicate with network 110, servers 120, or other clients 130. As an example and not by way of limitation, a client 130 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 130 may be an electronic device including hardware, software, or both for providing the functionality of client 130. As an example and not by way of limitation, a client 130 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 130 may include one or more clients 130; be unitary or distributed; span multiple locations; span multiple machines; span multiple datacenters; or reside in a cloud, which may include one or more cloud components in one or more networks.

VLAN trunking protocol, or VLAN trunk protocol (VTP) is a Cisco proprietary Layer 2 messaging protocol that manages the addition, deletion, and renaming of virtual local area networks (VLAN) on a network-wide basis. Cisco's VLAN trunk protocol reduces administration in a switched network. When a new VLAN is configured on one VTP server, the VLAN is distributed through all switches in the domain. This reduces the need to configure the same VLAN everywhere. To do this, VTP carries VLAN information to all the switches in a VTP domain. VTP advertisements can be sent over inter-switch link protocol (ISL), 802.1q, Institute of electrical and electronics engineers (IEEE) 802.10 and LAN emulation (LANE) trunks. VTP is available on most of the Cisco Catalyst Family products.

VTP ensures that all switches in the VTP domain are aware of all VLANs. However, there are occasions when VTP can create unnecessary traffic. All unknown unicasts and broadcasts in a VLAN are flooded over the entire VLAN. All switches in the network receive all broadcasts, even in situations in which few users are connected in that VLAN. VTP pruning is a feature that used in order to eliminate or prune this unnecessary traffic.

Figure 2A:
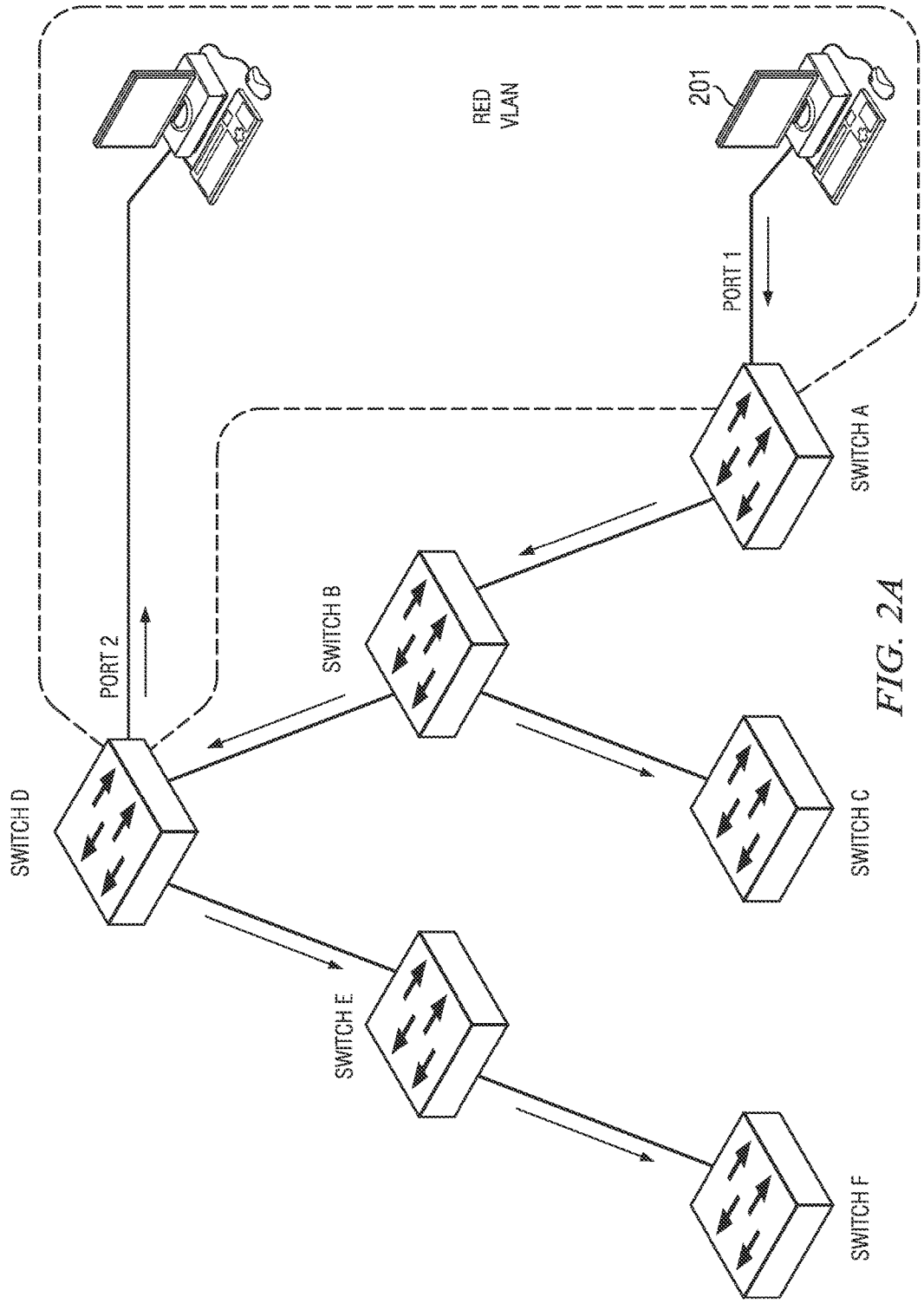
FIG. 2A illustrates an example network with VLAN trunking protocol (VTP) pruning disabled.

FIG. 2A shows a switched network without VTP pruning enabled. Port 1 on Switch A and Port 2 on Switch D are assigned to the Red VLAN. If a broadcast is sent from the host 201 connected to Switch A, Switch A floods the broadcast and every switch in the network receives it, even though Switches C, E, and F have no ports in the Red VLAN.

Figure 2B:
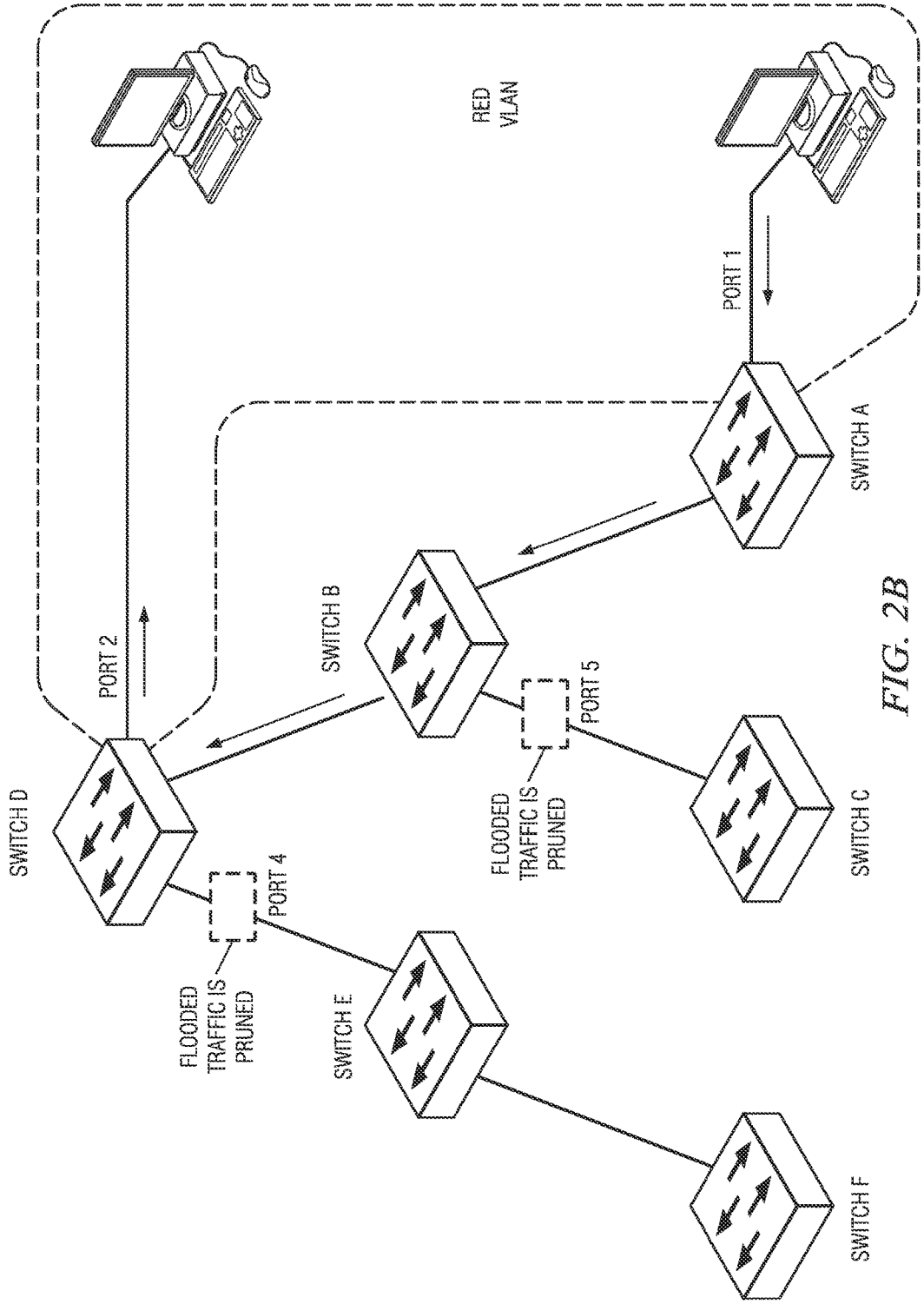
FIG. 2B illustrates the same example network with VTP pruning enabled.

FIG. 2B illustrates the same network with pruning enabled. The broadcast traffic from Switch A is not forwarded to Switches C, E, and F because traffic for the Red VLAN has been pruned on the links shown (Port 5 on Switch B and Port 4 on Switch D).

When VTP pruning is enabled on a VTP server, pruning is enabled for the entire management domain. Making VLANs pruning-eligible or pruning-ineligible affects pruning eligibility for those VLANs on that trunk only (not on all switches in the VTP domain). VTP pruning takes effect several seconds after it is enabled. VTP pruning does not prune traffic from VLANs that are pruning-ineligible.

Figure 3:
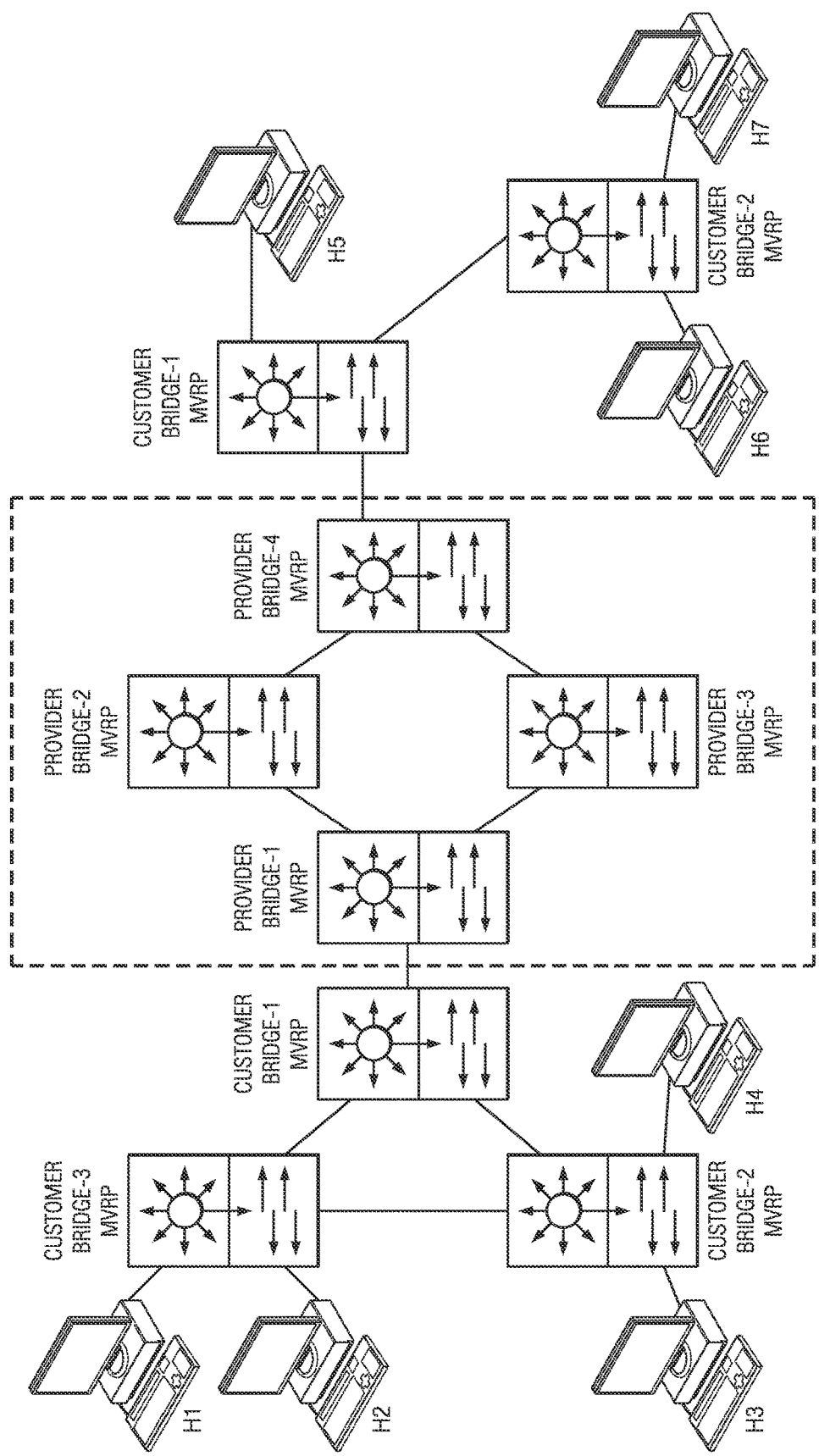
FIG. 3 illustrates an example network running MVRP.

FIG. 3 illustrates an example network running MVRP. IEEE 802.1ak, also known as multiple registration protocol (MRP), allows dynamic registration and deregistration of VLANs on ports in a VLAN bridged network. IEEE 802.1ak provides performance improvement over the generic attribute registration protocol (GARP) VLAN registration protocol (GVRP) and GARP multicast registration protocol (GMRP) protocols with more efficient Protocol Data Units (PDUs) and protocol design. This feature implements MRP and MVRP as specified in the IEEE 802.1ak standard.

In a VLAN bridged network, it is desirable to restrict unknown unicast, multicast, and broadcast traffic to those links which the traffic must use to access the appropriate network devices. In a large network, localized topology changes can affect the service over a much larger portion of the network. IEEE 802.1ak replaces generic attribute registration protocol (GARP) with MRP offering much improvement over resource utilization and conservation of bandwidth.

With the 802.1ak MRP attribute encoding scheme, MVRP only needs to send one PDU that includes the state of all VLANs on a port. MVRP also includes the transmission of a topology change notification (TCN) for individual VLANs. This is an important feature for service providers because it allows them to localize topology changes. However, currently, topology changes in network environments having pruned ports can result in significant delays in layer two convergence, because MVRP PDUs are not propagated across blocked ports.

Figures 4, 5:
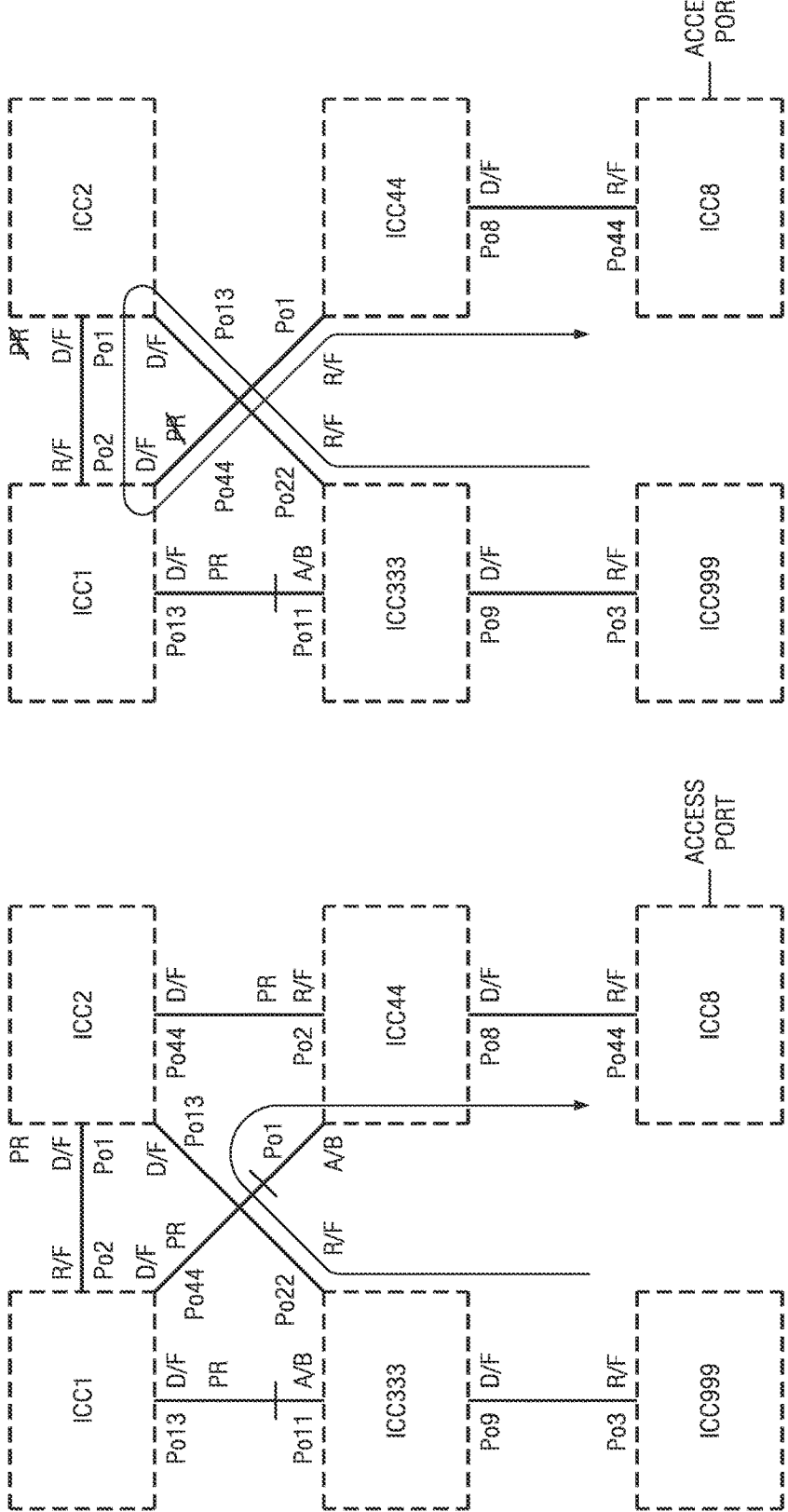
FIG. 4 illustrates an example network in an initial state.
FIG. 5 illustrates the same example network after a link failure.

FIG. 4 illustrates an example layer 2 network. Initially, ICC2 is the root and all port channels are up. Only two ports are blocked, Po11 on ICC3 and Po1 on ICC44. There is a local association of VLAN 10 on ICC8 and traffic of VLAN 10 is sent from ICC999 to ICC8 through ICC333, ICC2, and ICC4. Po1 on ICC2 is pruned to prevent unnecessary flooding on ICC1.

FIG. 5 depicts an example where the port channel between ICC2 and ICC44 goes down due to failure. Po1 on ICC44 will be unblocked and VLAN 10 traffic will flow from ICC999 via ICC333, ICC2, ICC1, and ICC44. Before flooding in VLAN 10 can be resumed, Po1 on ICC2 needs to be unpruned so that traffic can be sent to ICC1. The flow of flooding traffic is critical during reconvergence as MAC tables are typically flushed by the loop prevention protocol upon topology change.

There are two issues affecting expedient unpruning of the ports, first, the sequential nature of topology convergence, and second, long propagation delays:

1.) Sequential to topology convergence: MVRP will not send join messages out of blocked ports nor propagate join messages received from blocked ports. Therefore, unpruning of ports will occur after active topology settlement rather than in parallel.
2.) Long propagation delays: MVRP PDUs are consumed and regenerated in the control plane hop-by-hop. There can be substantial delays if the propagation distance is long and the control plane is busy. For example, in order to unprune Po1 on ICC2, a join message from ICC8 needs to be relayed by control planes of both ICC44 and ICC1. The MVRP PDU may not be processed promptly due to heavy CPU load, for example, because of processing required to handle the STP topology change.

In particular embodiments, faster layer-two convergence can be achieved by broadcasting a TUP message. In particular embodiments, the TUP message includes at least the following fields:

1.) Originator bridge ID
2.) Sequence number specific to the bridge ID
3.) Duration of an initial phase timer
4.) List of VLANs to be unpruned In particular embodiments, two types of frames carry the TUP message. The first type are multicast frames with a non-reserved destination address (type 1 frames). Switches in the network are programmed in such a way that these frames will be forwarded normally as data, as well as punted to the CPU. These frames must be processed immediately by control planes, possibly within interrupt contexts.

The second type of frames carrying the TUP message are multicast frames with reserved destination addresses such as Cisco address 0100.0CCC.CCCC or IEEE address 0180C2.000003 (type 2 frames). These frames will be punted to the receiving node's CPU only. However, unlike the first type of frames, these frames will go through blocked ports.

Figure 6:
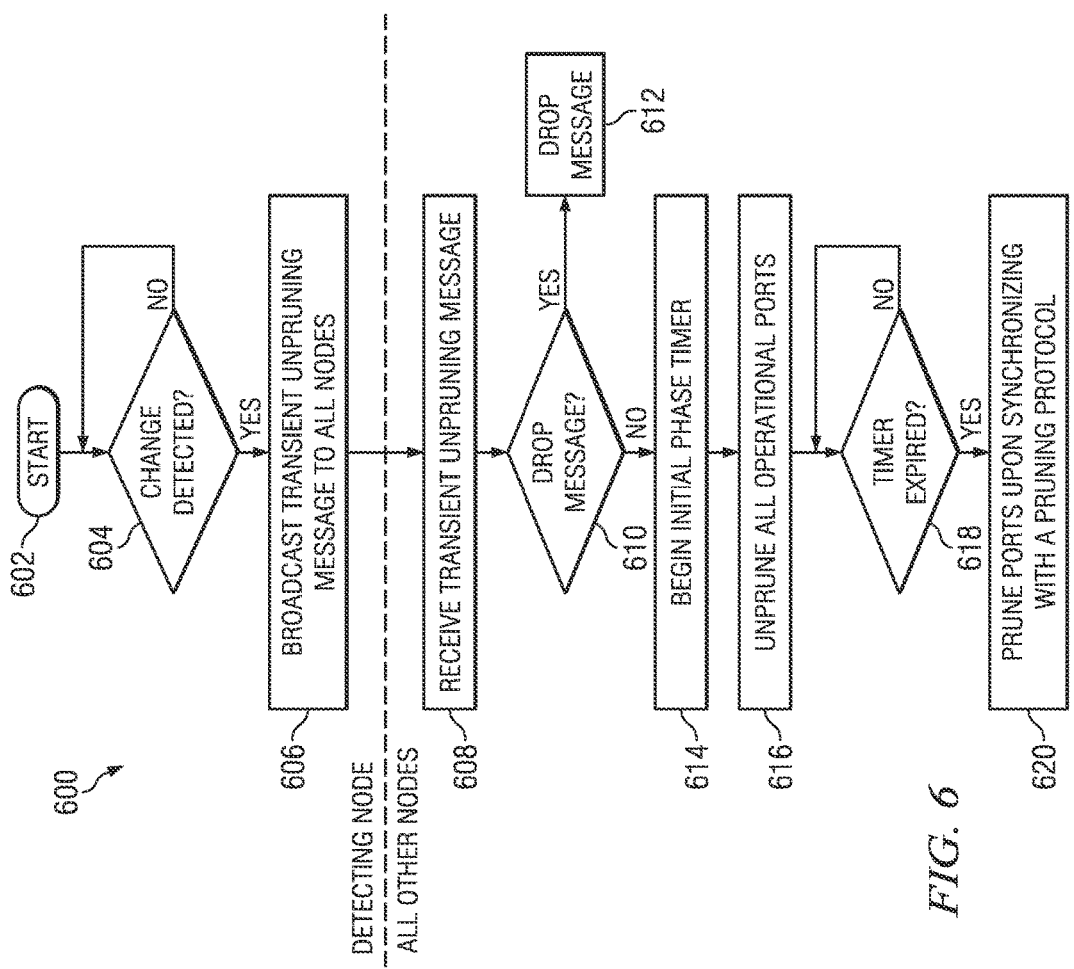
FIG. 6 illustrates an example method for transient unconditional pruning for faster layer two convergence.

FIG. 6 illustrates an example method for transient unpruning for faster layer-two convergence. At any given moment, the control planes of the various network switches are constantly running a pruning protocol, such as MVRP. Although MVRP is described, in particular embodiments, VTP may be used. This disclosure contemplates the use of any suitable pruning protocol At step 604, a network node, for example a bridge, switch, or router, detects a local topology change due to link failure or other unknown causes. At step 606, the detecting network node broadcasts both type 1 and type 2 TUP messages.

At step 608, another node receives the TUP message. The receiving node at step 610 decides whether to drop or forward the message. Upon receiving a TUP message, the switch (or node) determines if the message has been received before, based on its originator bridge ID and sequence number. If it is a duplicate, the switch, at Step 612, will drop it without taking any action. Otherwise if it is carried in a type 2 frame, the control plane will flood it out of all ports regardless of whether the ports are blocked or not. If it is carried in a type 1 frame, the TUP message is flooded out of non-blocked ports through the control plane.

Independent of the type of frame received, the node first unprunes all its operational ports based on the VLAN list field. At step 614, the receiving node starts an initial phase timer. This timer is based on the duration field in the TUP message. If the timer has already been started due to a previous message, the switch or node extends the expiration period of the phase time based on the new message. Upon expiration of the timer at step 616, the process proceeds to Step 620, where the switch prunes those nodes whose MVRP states still do not indicate being unpruned. Thus the ports are pruned in accordance with a running pruning protocol.

Since the generation and transmission of TUP messages are independent of active topology convergence, ports in the active topology could be unpruned even before they are unblocked. In addition, the hardware assistance in forwarding TUP messages carried in type 1 frames reduces propagation delays substantially. While type 2 TUP frames are propagated more slowly, they can penetrate possible disconnected topology before convergence and still achieve the goal of parallel processing.

TUP messages generate minimal loads on both the network and the individual switch CPUs due to their small size and simple processing logic. For networks whose deployment demands minimal traffic disruption, the disclosed method can be enabled to significantly reduce convergence time.

Figure 7:
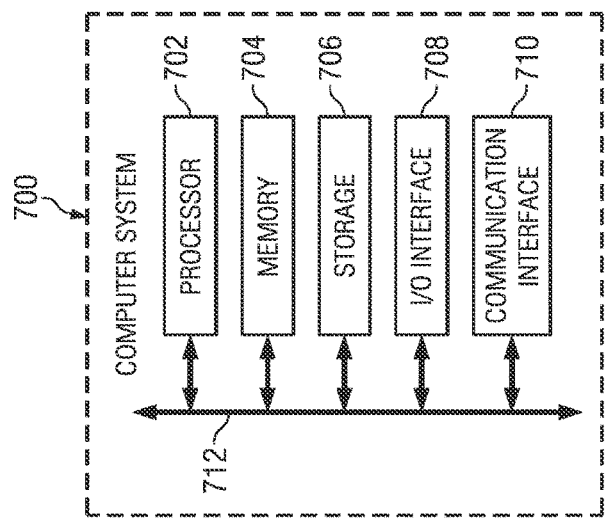
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-Active module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by an originating node in a network, detecting a change in a topology of the network; and
by the originating node, broadcasting a transient unpruning (TUP) message to a plurality of other nodes in the network, wherein:
the TUP message is configured to instruct each of the other nodes receiving the message to:
start a phase timer;
unprune its operational ports; and
upon expiration of the phase timer, prune its ports in accordance with a pruning protocol; and
the TUP message comprises:
an identifier of the originating node;
a sequence number associated with the TUP message; and
a duration of the phase timer.

2. The method of claim 1, wherein the TUP message further comprises a list of virtual local area networks (VLANs) to be unpruned.

3. The method of claim 1, wherein unpruning the operational ports comprises unpruning a subset of the operational ports.

4. The method of claim 3, wherein the subset of operational ports is determined by user configuration.

5. The method of claim 1, wherein the TUP message is carried in a multicast frame with a non-reserved destination address.

6. The method of claim 1, wherein the TUP message is carried in a multicast frame with a reserved destination address.

7. The method of claim 1, wherein broadcasting the TUP message comprises transmitting both a multicast frame with a non-reserved destination address and a multicast frame with a reserved destination address.

8. The method of claim 1, wherein the pruning protocol is multiple virtual local area network (VLAN) registration protocol (MVRP).

9. The method of claim 1, wherein the pruning protocol is virtual local area network (VLAN) trunking protocol (VTP).

10. An originating node of a network, comprising:
one or more processors; and
a memory coupled to the processors comprising instructions executable by the processors, the processors being operable when executing the instructions to:
detect a change in a topology of the network; and
broadcast a transient unpruning (TUP) message to a plurality of other nodes in the network, wherein:
the TUP message is configured to instruct each of the other nodes receiving the message to:
start a phase timer;
unprune its operational ports; and
upon expiration of the phase timer, prune its ports in accordance with a pruning protocol; and
the TUP message comprises:
an identifier of the originating node;
a sequence number associated with the TUP message; and
a duration of the phase timer.

11. The originating node of claim 10, wherein the TUP message further comprises a list of virtual local area networks (VLANs) to be unpruned.

12. The originating node of claim 10, wherein unpruning the operational ports comprises unpruning a subset of the operational ports.

13. The originating node of claim 12, wherein the subset of operational ports is determined by user configuration.

14. The originating node of claim 10, wherein the TUP message is carried in a multicast frame with a non-reserved destination address.

15. The originating node of claim 10, wherein the TUP message is carried in a multicast frame with a reserved destination address.

16. The originating node of claim 10, wherein broadcasting the TUP message comprises transmitting both a multicast frame with a non-reserved destination address and a multicast frame with a reserved destination address.

17. The originating node of claim 10, wherein the pruning protocol is multiple virtual local area network (VLAN) registration protocol (MVRP).

18. One or more non-transitory computer-readable storage media embodying logic that is operable when executed to:
detect a change in a topology of a network; and
broadcast a transient unpruning (TUP) message to a plurality of nodes in the network, wherein:
the TUP message is configured to instruct each of the other nodes receiving the message to:
start a phase timer;
unprune its operational ports; and
upon expiration of the phase timer, prune its ports in accordance with a pruning protocol; and
the TUP message comprises:
an identifier of the originating node;
a sequence number associated with the TUP message; and
a duration of the phase timer.

* * * * *